United States Patent [19]
Wölfges

[11] Patent Number: 4,590,968
[45] Date of Patent: May 27, 1986

[54] PILOT VALVE OPERATED PRESSURE REDUCING VALVE

[75] Inventor: Hans Wölfges, Lohr, Fed. Rep. of Germany

[73] Assignee: Mannesmann Rexroth GmbH, Fed. Rep. of Germany

[21] Appl. No.: 622,092

[22] Filed: Jun. 18, 1984

[30] Foreign Application Priority Data

Jun. 29, 1983 [DE] Fed. Rep. of Germany ....... 3323363

[51] Int. Cl.[4] .......................................... F15B 13/043
[52] U.S. Cl. .................... 137/625.64; 91/433
[58] Field of Search .......... 91/433; 137/625.6, 625.61, 137/625.64

[56] References Cited

U.S. PATENT DOCUMENTS

| | | | |
|---|---|---|---|
| 3,286,734 | 11/1966 | Hartshorne | 137/625.64 |
| 3,324,890 | 6/1967 | Whitmore et al. | |
| 3,486,801 | 12/1969 | Frayer | 137/625.64 X |
| 3,727,487 | 4/1973 | Forster et al. | 137/625.64 X |
| 3,791,408 | 2/1974 | Saitou et al. | 251/129 X |
| 3,856,047 | 12/1974 | Takayama | 137/625.64 X |

FOREIGN PATENT DOCUMENTS

| | | |
|---|---|---|
| 2903560 | 8/1980 | Fed. Rep. of Germany . |
| 2923694 | 12/1980 | Fed. Rep. of Germany . |
| 167905 | 12/1981 | Japan ............................ 137/625.64 |
| 2102158 | 1/1983 | United Kingdom .......... 137/625.64 |
| 2101772 | 1/1983 | United Kingdom .......... 137/625.64 |

*Primary Examiner*—Gerald A. Michalsky
*Attorney, Agent, or Firm*—Harness, Dickey & Pierce

[57] ABSTRACT

The invention refers to a pressure reducing valve including a pilot valve. The main piston of the pressure reducing valve allows to selectively connect a load port to either a port connected to a pressure source or to a port connected to the reservoir. The pilot valve is connected to a control pressure line and to the reservoir. The main piston controlled connection to the reservoir opens within the valve housing into a port connecting the pilot valve to the reservoir. This provides for a substantially simplified construction of the valve since there are only two operating ports and a reservoir port. Furthermore, the main piston is engaged by a spring which is capable of becoming activated such that dynamic stresses resulting from a change from high to low pressure values are avoided which vibrations are detrimental in generating pressure peaks as well as pressure breaks.

13 Claims, 4 Drawing Figures

PILOT VALVE OPERATED PRESSURE REDUCING VALVE

FIELD OF THE INVENTION

The invention relates to a pressure reducing valve comprising a main piston including a first and a second control edge, which first control edge controls the communication between a port connected to a load and a high pressure port connected to a pressure source, wherein the spring engaged main piston is loaded by the load pressure and in opposition therewith by a control pressure via a control line including an orifice, and which second control edge controls the communication between the load port and a port connected to reservoir, and comprising a pilot valve including a control pressure loaded valve member and a solenoid to adjust a predetermined load pressure, said pilot valve opening when the load pressure reaches said predetermined value to release the control pressure via a reservoir line, wherein the main piston is displaced by the pressure drop acting on the main piston towards closing the first control edge and toward opening the second control edge, and wherein the load pressure is released through the reservoir line when the pilot valve is switched from a high to a low value of load pressure.

PRIOR ART

A pressure reducing valve of the above-identified type is known from German Pat. No. 29 03 560. However, this particular valve comprises three operating ports and at least a control port. An operating port each is connected to the load, to the pressure source and to the reservoir. The pilot valve is connected through a control pressure line to the load port or to the pressure source and further includes a connection to the reservoir. With a stationary load, for example when the piston of a servo motor comes to rest on a positive stop, the large cross-section of the main piston controlled flow path from the load to the reservoir allows for a quick pressure release of the load when the pilot valve is switched from a high to a low pressurevalue, but the quick pressure release results in strong pressure oscillations until the low pressure value is reached. The particular pressure breaks and pressure peaks cannot be tolerated.

SUMMARY OF THE INVENTION

An object of the present invention is to improve a pressure reducing valve of the type above referred to to allow for a quick pressure release, to reduce the expenditures of construction and to avoid dynamic pressure transients when the pressure is adjusted to a lower value.

According to the present invention the port connected to the reservoir opens within the valve housing into the line connecting the pilot valve to the reservoir, and a spring cooperates with the main piston which spring becomes active in displacing the main piston towards opening the second control edge.

Since the flow communication between the load the reservoir port is directly connected to the control line leading from the pilot valve to the reservoir, which communication is controlled by the second control edge of the main piston, the construction expenditure of the valve is substantially reduced as there are merely a pair of operating ports of large cross-section, that is, to the load and to the pressure source, and further a port of relatively small cross-section leading to the reservoir, are necessary. It is thus possible to mount the pressure reducing valve on a subplate which is usually provided for two-way pressure-reducing valves. Nevertheless, the control line to the reservoir provides for a sufficiently large cross-section which allows for a very quick pressure release of the load.

Besides the control pressure, the main piston is engaged by a control spring which acts either in the same or the opposite sense according to the type of valve. To avoid the vibratory pulses above referred to, a particular spring is provided which becomes active when the connection from the load to the reservoir is suddenly opened by the main piston. The spring increases the pressure acting on the main piston which is acted on by the control pressure adjusted at the pilot valve plus the control spring. Drops the load pressure below said pressure increased by the spring, the main piston is moved towards closing the connection between the load and reservoir, the switch-on spring becoming ineffective, whereby merely the pressure adjusted at the pilot valve plus or minus the pressure of the other control spring acts on the main piston. This provides for the unique feature that the load pressure is slowly released in the range between the pressure which is determined by said switch spring and the control pressure set without generating pressure peaks and drops. Summarizing, a very quick pressure release down to the bias pressure due to the switch spring is provided, followed by slowly and continuously further reducing the remaining pressure between the bias pressure and the desired load pressure.

Further features and embodiments of the present invention are defined in the further claims. In particular, a number of claims is directed to a variety of embodiments of the valve based on an identical principle of construction.

DETAILED DESCRIPTION

Figure 1:
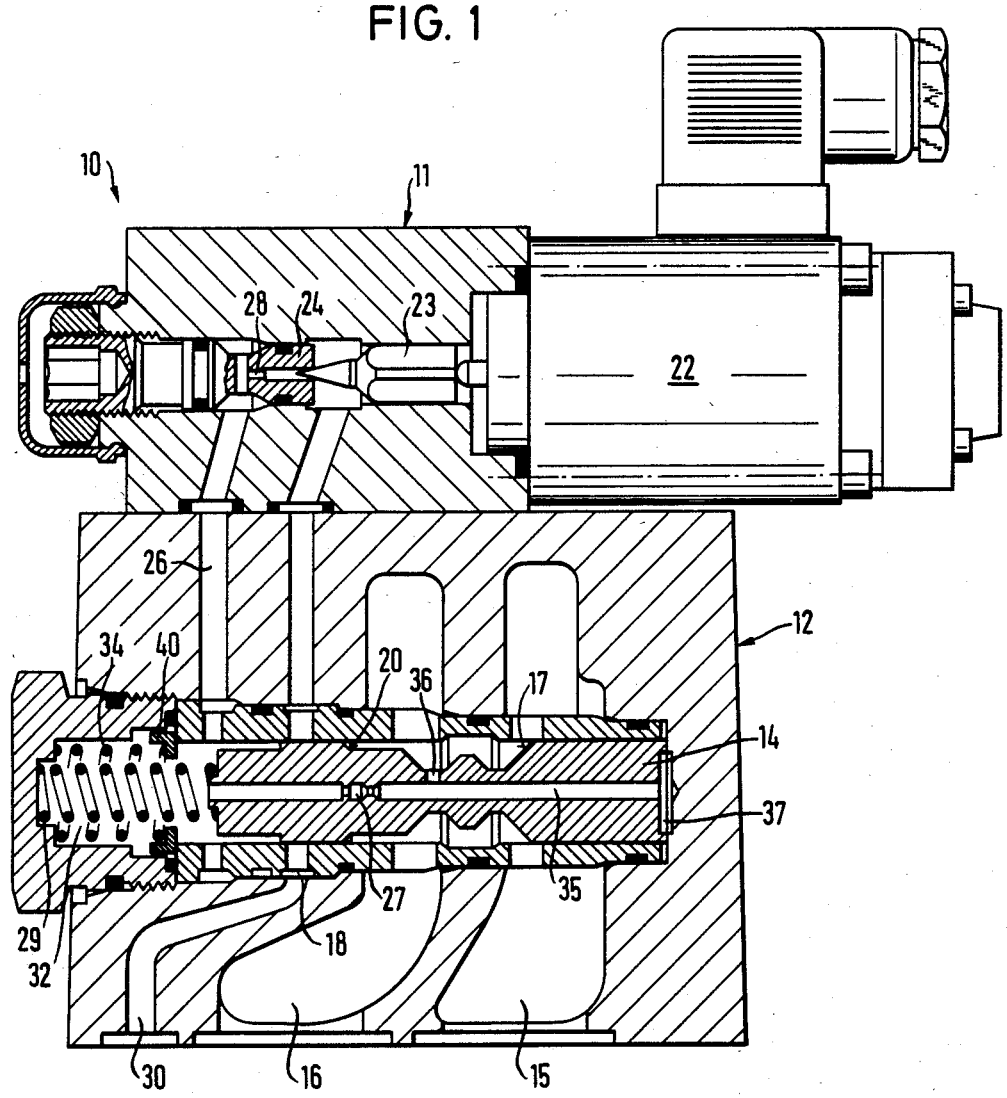
FIG. 1 is a section of a pressure reducing valve including a pilot valve.

The pressure reducing valve 10 shown in FIG. 1, in particular for pressure reducing high capacity flow volumes, comprises a pilot valve 11 and a main valve 12 including a main piston 14 which completely opens a high pressure port 15 connected to a pressure source and a load port 16 connected to a load when the main piston is in the neutral position shown. The flow path from the high pressure port 15 to the load port 16 is provided by a first control edge 17 of the main piston 14. When the main piston 14 is displaced to the left, the flow path via the first control edge 17 is closed and a flow path from the load port 16 to a port 18 connected to the reservoir is opened through a second control edge 20 of the main piston 14.

A desired load pressure in the port 16 is electrically adjusted by the solenoid 22 of the pilot valve 11 which solenoid urges a valve member 23 onto the valve seat 24 in opposition to a control pressure which is taken from the load port 16. For this a control pressure line 26, orifices 27 and 28 and bores 35,36 in the main piston 14 are provided. Further, the control pressure acts on both front faces of the main piston 14.

As long as the pressure in the high pressure port 15 is smaller than the pressure adjusted at the pilot valve, the main piston 14 stays in the opened position by means of the control spring 29. When the pressure in port 16 reaches the adjusted value, the pilot valve opens and pressure medium flows across the valve seat 24 and the valve member 23 into the line 30 leading to the reservoir T. Accordingly a pressure drop is produced which moves the main piston 14 to the left towards closing direction. When the piston in the servomotor 38 was moved towards a positive stop, the main piston closes so far that the draining losses and the control liquid for the pilot valve only flow across the first control edge 17 from the high pressure port 15 into the load port 16.

To switch the pressure in the load 38 to a lower value, the solenoid 12 of the pilot valve is controlled by a corresponding current and the pilot valve opens. Accordingly the pressure on the left face of the main piston 14 in the control chamber 32 drops and the main piston is displaced to the left until the load port 16 is connected to the reservoir port 18 across the second control edge 20 of the main piston. Thus the expansion volume may escape from the load 38 through the port 18 to the reservoir. This provides for a quick pressure reduction in the load 38. The valve shown has the unique feature that it merely includes a port 16 for the load and a port 15 for the high pressure and a line 30 for the reservoir into which the port 18 opens and which line has a relatively small cros-section. This means a substantially simplified design when compared with the prior art pressure reducing valves which need a port 18 of large cross-section which makes an individual working port necessary.

The short pressure reducing time in opening the communication between the load port 16 and the reservoir port 18 via the second control edge results in oscillations in adjusting the pilot valve to the lower pressure. The main piston thus starts to move towards closing the second control edge only then when the load pressure has dropped below the control pressure plus the force of the control spring 29. Since the main piston needs a certain time to close the connection to the reservoir, there is a pressure drop in the load port which is remedied only after an extended transient time. Particularly with injection molding machines, any pressure drops including transient phenomena are not desired.

To avoid this, an additional spring 34 is provided which acts on the main piston 14 and becomes active when the main piston has performed a predetermined stroke.

Figure 2:
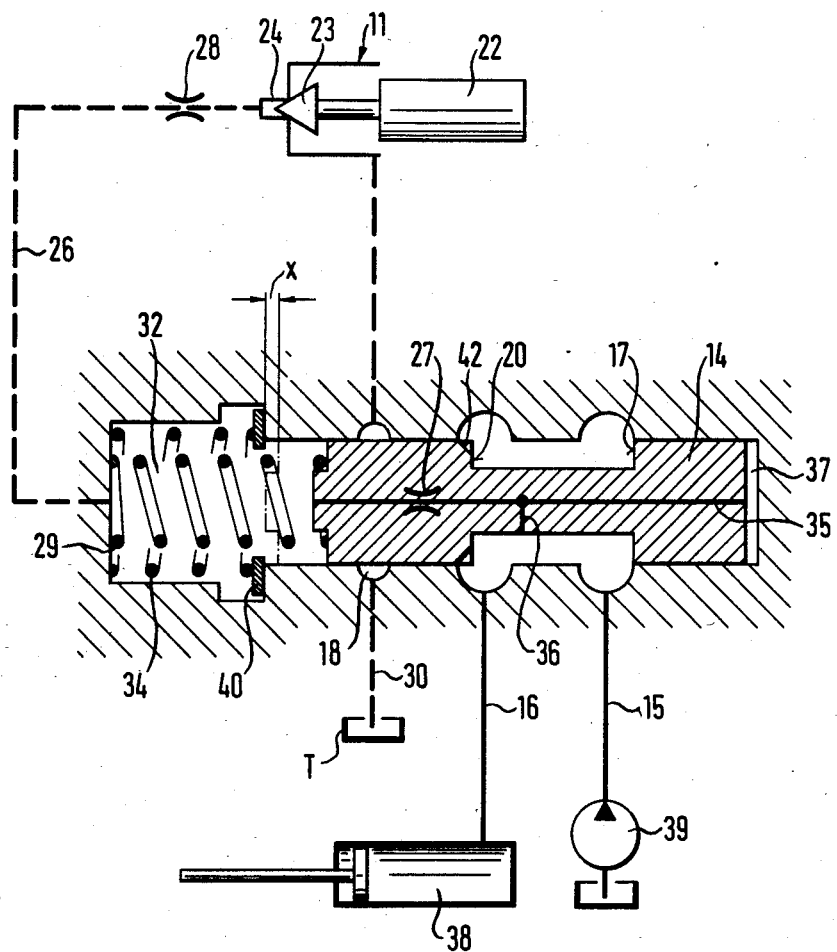
FIG. 2 is a schematic illustration of the pressure reducing valve according to FIG. 1 in which the control pressure is taken from the load port.

In FIG. 2 the pressure reducing valve shown in FIG. 1 is schematically shown. Identical components bear identical reference numerals. The main piston 14 includes a central bore 35 which is connected through a radial bore 36 to the load port 16, through the throttle 27 to the control chamber 32 and further to the space 37 on the right face of the main piston 14. The load port 16 is connected to the load 38, for example a servo motor and the high pressure port 15 is connected to a pump 39.

As in FIG. 1 the load pressure is supplied to the chamber 37 and the control pressure together with the control spring 29 acts in the control chamber 32. The switch-on spring 34 is supported by a spring retainer 40 on a shoulder of the valve housing and becomes effective only then when the main piston 14 is displaced towards the left such that its front edge lifts the spring retainer 40 off the casing. In this position of the main piston in which the spring 34 becomes effective, the communication from the high pressure port 15 to the load port 16 through the first control edge 17 of the main piston is closed and the communication between the load port 16 and the port 18 is opened such that the flow path is possible only across the metering notches 42 of the second control edge 20.

When the spring 34 is moved to the left by the main piston 14 and is thus compressed, the connection to the port 18 will be fully opened.

With respect to FIG. 2 it is now assumed that a high pressure, for example 140 bar are adjusted for the load 38 and that the piston of the load 38 has been moved into an end position shown. For changing the pressure in the load 38 to a lower value, for example 45 bar, the lower value is adjusted at the pilot valve by a corresponding current control of the solenoid 22, the pilot valve opens and releases the control pressure to the reservoir via line 30 until a control pressure of 40 bar is reached in the control chamber 32. Now, the main piston 14 shoots to the left and fully opens the connection from the load port 16 to the reservoir port 18 to release the pressure in the load 38. The main piston 14 is engaged by the control pressure plus the forces of both springs 29 and 34 on the one side and by the load pressure in the chamber 37 in an opposite sense on the other side. When each spring exerts a pressure of 5 bar and when the spring 34 becomes effective when the main piston 14 is displaced to the left, the pressure acting on the main piston in the chamber 32 is 50 bar. The main piston 14 is balanced, when the load pressure will be released to 50 bar. As soon as the load pressure drops below 50 bar, the piston moves to the right and continuously closes the connection to the reservoir port 18 across the second control edge. When the main piston is displaced to the right so far that the spring 34 comes to a stop at the casing, the force acting on the main piston in the chamber 32 is reduced by 5 bar and a further pressure release from the load port 16 to the reservoir port 18 will be only obtained through the metering grooves 42 in the main piston until the load pressure is reduced to 45 bar. In this position of the main piston 14 in which its front face contacts the spring retainer 40, but the spring 34 not being effective, there is some liquid flow into the port 18 through the metering grooves 42. As soon as the load pressure in the chamber 37 will insignificantly drop below the pressure in the control chamber 32 plus the force of the control spring 29, the main piston is displaced to the right and completely closes the port 18. In this manner the pressure release from 140 bar to 50 bar takes place very rapidly, while the remaining pressure from 50 to 45 bar will be slowly reduced so that spikes and vibrations including pressure drops will be avoided. In other words, a pilot bias force is produced by the switch-on spring 34 shortly before the desired lower pressure is reached, whereupon the further pressure release from the pilot bias pressure to the end pressure takes place slowly under damping conditions through the metering notches of the main piston.

Figure 3:
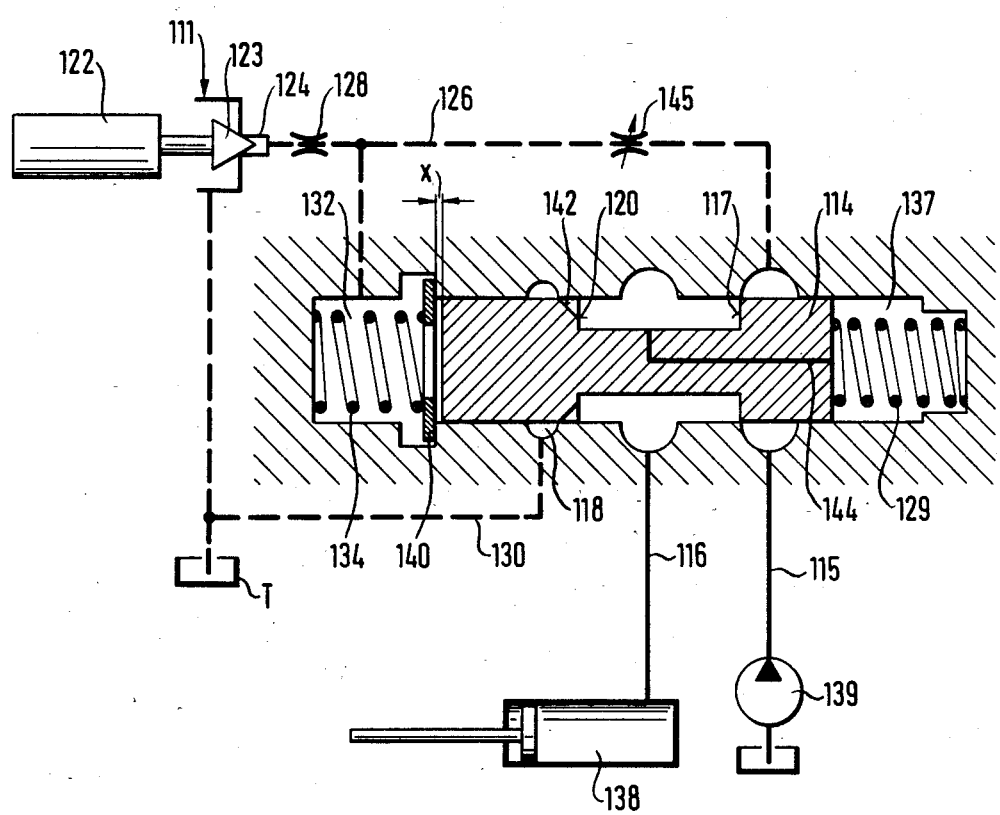
FIG. 3 is a schematic illustration of a pressure reducing valve in which the control pressure is taken from the high pressure port.

FIG. 3 alike shows a pilot valve operated pressure reducing valve which components are designated with identical reference numerals, but with the prefix 1. In contrast to the embodiments of FIGS. 1 and 2 the control pressure is taken from the high pressure port 115. The control pressure line 126 is thus connected to the high pressure port 115 and the main piston 14 is provided with a bore 144 connecting the load port 116 to the chamber 137 in which the control spring 129 is accommodated. The load pressure and the force exerted by the control spring 129 act towards the closing direction of the first control edge 117 of the main piston 114. The orifice 27 of FIG. 2 is replaced by a flow control valve 145 in the control pressure line 126.

The operation in switching the load 138 from a high to a low pressure of for example 35 bar is summarized as follows when the piston of the load 138 has been moved into an end position.

The control pressure in the chamber 132 drops to 40 bar so that the main piston 114 is suddenly moved to the left by the force of the control spring 129 and the high load pressure in the chamber 137, whereupon the control edge 120 fully opens the connection from the load port 116 to the reservoir port 118. In this the spring 134 becomes effective when the spring retainer 140 is lifted off by the left front face of the main piston 114. Assuming that both springs 129 and 134 exert a pressure of 5 bar to the main piston in an opposite sense, the load pressure may be released to 40 bar until the main piston 114 is in balance i.e. equal spring forces and equal pressure forces acting on it in the spaces 132 and 137. After the load pressure in the chamber 137 further drops since the further pressure release is effective from 116 to 118, the main piston is moved to the right by the action of the spring 134 until the spring retainer 140 stops at the casing so that the spring 134 becomes ineffective, whereby the control pressure of 40 bar only acts on the left face of the main piston. The main piston stays in this position in which the load port 116 is connected to the reservoir 118 merely across the metering grooves 142 so that in this position a continuous and slow pressure release is obtained at the load 138 until the pressure in the chamber 137 drops somewhat below 35 bar. Then the control pressure of 40 bar in chamber 132 moves the main piston 114 against the force of the control spring 129 of 5 bar and the load pressure of somewhat 35 bar to the right until the connection to the reservoir port 118 is completely closed. Consequently a very quick pressure release to 40 bar is followed by a slow transient of pressure to the desired end pressure of 35 bar.

Figure 4:
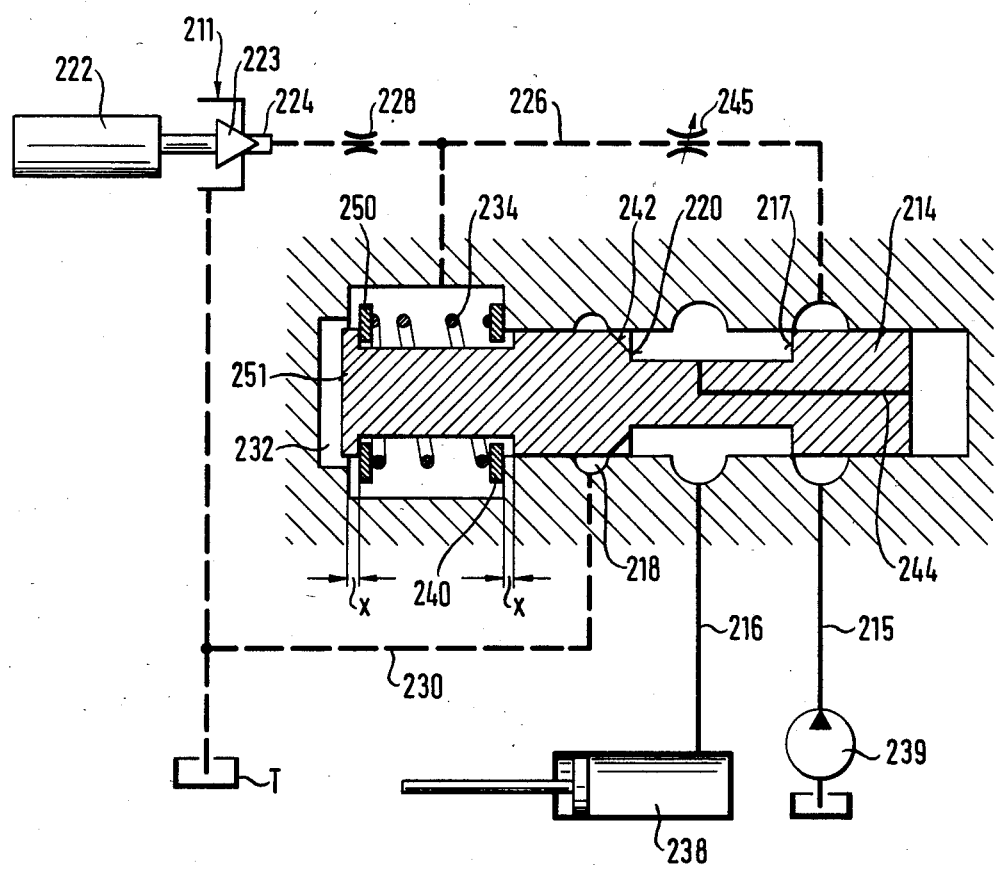
FIG. 4 is a schematic illustration of a pressure reducing valve in which the control pressure is taken from the high pressure port and in which a single spring is provided.

The pressure reducing valve shown in FIG. 4 is different from the valve shown in FIG. 3 by eliminating the control spring 129 and providing a single spring 234 in the control chamber 232, the direction of the spring force acting on the main piston 214 being reversible. The same components bear identical reference numerals, but including the prefix 2. While the spring 234 is supported through its spring retainer 240 on a stop of the valve casing, and, as explained in FIG. 3, becomes effective in displacing the main piston 214 to the left by the front face thereof after performing the stroke x, contrarily to the embodiment in FIG. 3 the opposite end of the spring 234 is supported by means of a spring retainer 250 on a flange 251 of the main piston thus acting towards opening the second control edge 220 in the position of the main piston shown.

With the piston of the load 238 being in the end position and adjusting the high pressure controlled by the pilot valve 211 to a smaller value, the main piston 214 is rapidly moved to the left after adjusting a lower control pressure at the pilot valve 211. The connection from the load port 216 to the reservoir port 218 is completely opened so that the pressure in the load 238 is rapidly reduced. In this opening position of the valve the control pressure of 40 bar in the control chamber 232 which pressure has been set at the pilot valve 211 acts in addition to the force of the effective spring 234 of for example 5 bar. After the load pressure is reduced to 45 bar, the main piston 214 is balanced and a further pressure release at the load effects a piston movement to the right until the spring retainer 240 abuts the stop of the casing whereby the direction of the force of the spring 234 is reversed, that is, the spring force of for example 5 bar acts in opposition to the control pressure of 40 bar in the control chamber on the main piston 214 which keeps its position in which a further pressure release takes place towards the reservoir port through the metering grooves 242 until the load pressure dropped to 35 bar. By reversing the directional force of the spring 234, the force of 40 bar control pressure less 5 bar spring pressure act on the main piston to move it to the right. After the load pressure dropped somewhat below 35 bar, the main piston is moved into the position shown in which the connection to the reservoir port 218 across the control edge 217 is completely closed.

According to FIGS. 2, 3 and 4 a tolerance x is provided for the control position of the main piston 14, 114 or 214 in which position the control edges close either the high pressure port 15, 115, 215 or, respectively, the reservoir port 18, 118, 218 before the main piston may engage the spring 34, 134, 234. This tolerance avoids that the spring 34, 134, 234 is actuated when not desired, as the main piston may perform rather small control strokes to compensate for pressure losses due to some leakage in the load 38, 138, 238, for example.

What is claimed is:

1. A pressure reducing valve for controlling the communication between a high pressure port, a load port and a reservoir port each formed by a valve housing, a main piston slidable within said valve housing between a first position, a second position and a third position, said valve housing and said main piston having cooperating metering means for providing substantially unrestricted flow communication between said high pressure port and said load port and no communication between said load port and said reservoir port when said main piston is in said first position, no communication between said high pressure port and said load port and restricted communication between said load port and said reservoir port when said main piston is in said second position and less restricted communication between said reservoir port and said load port and no communication between said load port and said high pressure port when said main piston is in said third position, means for applying a control pressure to said main piston for controlling the position of said main piston, and biasing means for urging said main piston from said third position only to said second position for effecting a rapid initial decrease in pressure at said load port until said main piston is in its second position and thereafter a less rapid decrease in pressure.

2. The pressure reducing valve of claim 1 wherein a pressure control line leading to a pilot valve is branched off the high pressure port, wherein the main piston is unidirectional loaded by the load pressure and a further control spring and in opposition thereto by the control pressure adjusted at the pilot valve and exerted on said main piston in a control chamber and wherein the biasing means is located in said control chamber.

3. The pressure reducing valve of claim 2, wherein a flow control valve is provided in the control pressure line branched off the high pressure port.

4. The pressure reducing valve of claim 3, wherein an orifice is provided between the control chamber of the valve and the pilot valve.

5. The pressure reducing valve of claim 1 wherein a control pressure line leading to a pilot valve is branched of the high pressure port, wherein the main piston is engaged by the load pressure and in opposition thereto by the control pressure adjusted by said pilot valve and exerted on said main piston in a control chamber, the biasing means is loaded in said control chamber, the direction of spring force being reversible such that the spring acts towards opening the second control edge when the flow path from the high pressure port to the load port is opened and acting to close the second control edge when the flow path from the load port to the reservoir port is opened.

6. The pressure reducing valve of claim 5 wherein the main piston comprises a pair of stops and the switch on spring cooperating with a stop each.

7. The pressure reducing valve of claim 1, wherein the means for applying the control pressure to the main piston comprises means for applying the pressure at the load port to one end of the piston in opposition to the biasing means and means for applying a control pressure to the other end of said main piston acting in the same direction as the biasing means.

8. The pressure reducing valve of claim 7 wherein an orifice is provided between the load port and the other end of the main piston.

9. The pressure reducing valve of claim 7, wherein the biasing means comprises a switch-on spring and further including a biasing spring acting against the main piston in the same direction as said switch-on spring and continuously engaged with said main piston.

10. The pressure reducing valve of claim 9, wherein the cooperating metering means comprises a first control edge on the main piston cooperable with the high pressure port for controlling the communication between the high pressure port and the load port and a second control edge formed on said main piston and operative to control the communication between the load port and the reservoir port.

11. The pressure reducing valve of claim 10 wherein the switch-on spring is lifted off a stop formed by said valve housing by the main piston whereby said switch-on spring becomes effective when the stroke of said main piston exceeds a predetermined value, said main piston being moved towards opening the second control edge from the first position.

12. The pressure reducing valve of claim 11 wherein the main piston engages the switch-on spring in a position in which the flow connection of the load port to the reservoir port is defined across metering grooves formed in the second control edge for providing the restricted communication.

13. The pressure reducing valve of claim 10 in which a control pressure line leading to a pilot valve is branched off the load port, wherein the main piston is unidirectionally engaged by the control pressure and a pair of springs and in opposition thereto by the load pressure and wherein one of said springs is the switch-on spring.

* * * * *